Jan. 31, 1950     W. VAN DER WERFF     2,495,950
CENTRIFUGAL BOWL SEPARATOR
Filed Jan. 26, 1946
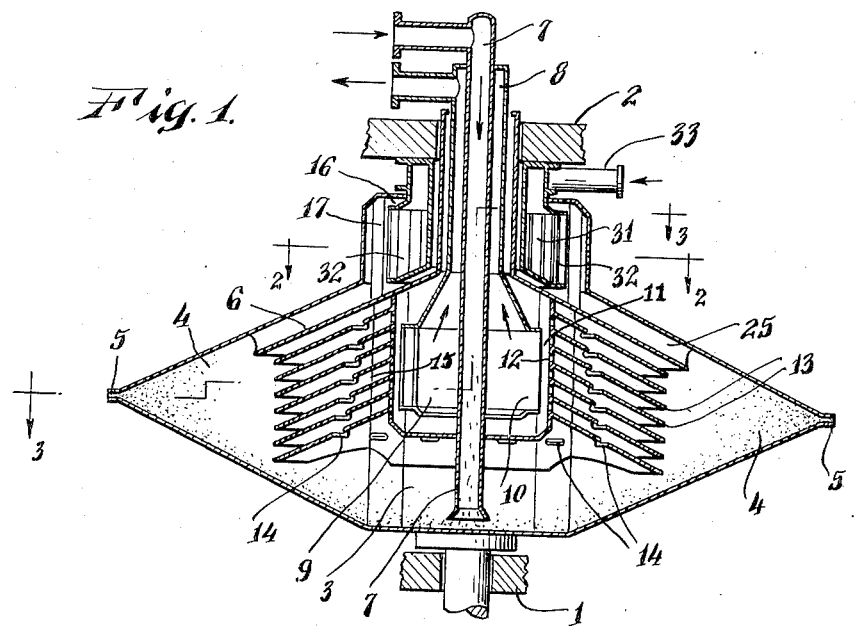
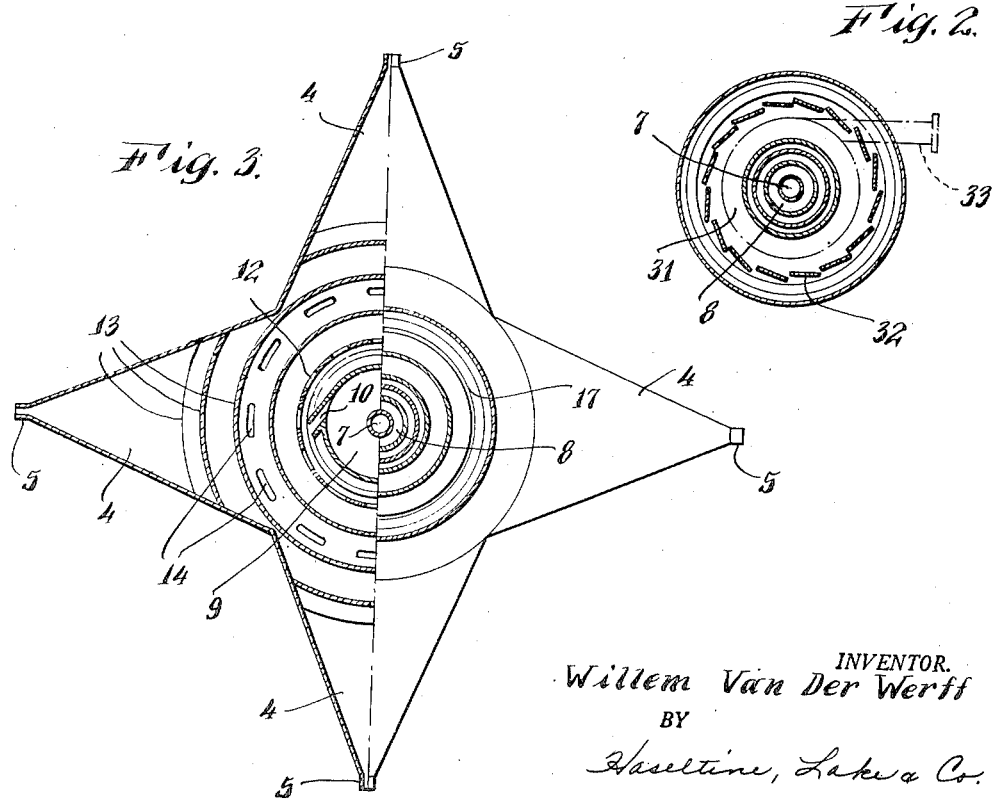
INVENTOR.
Willem Van Der Werff
BY
Haseltine, Lake & Co.
AGENTS.

Patented Jan. 31, 1950

2,495,950

UNITED STATES PATENT OFFICE 2,495,950

CENTRIFUGAL BOWL SEPARATOR

Willem van der Werff, Haarlem, Netherlands, assignor to Werkspoor N. V., Amsterdam, Netherlands Application January 26, 1946, Serial No. 643,791
In the Netherlands November 22, 1940

Section 1, Public Law 690, August 8, 1946
Patent expires November 22, 1960

1 Claim. (Cl. 233—21)

The invention relates to a centrifugal machine for continuously separating, by centrifugal action, two liquid components of a liquid mixture whether or not containing solids, in which the supply to the centrifugal machine is automatically controlled, in such a manner, that the boundary surface or region which forms in the operation of the machine between the two components of the mixture, may move only between predetermined limits.

In known centrifugal machines of the kind referred to, not only the difference between the specific weights of the liquid components (to which difference the separation is due), but also the difference between the electrical conductivities, or between the transparencies or other characteristics of said components is used for the automatic control of the supply.

In accordance with the invention, the control is effected by means of a free, substantially cylindric, hollow liquid surface which, during normal operation, establishes itself about the axis of rotation of the centrifugal machine in an auxiliary space of the rotor, a space, which under normal conditions of operation is accessible only to the heavy component of the liquid mixture, in contrast with known apparatus where the control is effected by utilizing the differing characteristics of the two components at both sides of the boundary region.

In the machine of the invention therefore, the greater buoyancy of the heavier liquid component may be utilized to its full extent for the control of the liquid supply, and thus a highly sensitive control with very simple and reliable means will be obtained.

In order that the separation may proceed smoothly and the movement of the boundary region between the liquid components may be confined to a very narrow zone, a further development of the invention refers to an arrangement by means of which the supply of mixture to the centrifugal machine, may be so adjusted that, if the rotor rotates at normal speed, the amount of liquid discharged through the exhaust ports for the heavy component exceeds the amount of heavy liquid supplied by the mixture, the deficiency of heavy liquid being supplied by an automatically controlled additional supply thereof.

In a specific embodiment of the invention, the rotor of the centrifugal machine comprises an auxiliary space accessible during operation only to the heavy liquid component and is provided with a spring loaded non-rotatable float or feeler cooperating with the free, substantially cylindric, hollow liquid surface, which is situated concentrically around the axis of rotation. This float or feeler controls, through a valve member, the supply of mixture, or the supply of additional heavy liquid, in such a manner, that if the diameter of the liquid surface increases or the free surface recedes, the supply of mixture, or of additional heavy liquid, respectively is increased and, vice versa, when the diameter decreases or the free surface rises, the supply is reduced.

The supply of additional heavy liquid may also be controlled without the use of movable means. According to this development of the invention, a stationary circle or ring of blades may be provided in concentric relation with the axis of rotation, within the auxiliary space exclusively accessible to the heavy component of the mixture. These blades surround a stationary chamber communicating with the rotary auxiliary space through the passages between the blades. To this stationary chamber, the additional heavy liquid is supplied. The blades extend outwardly in a direction opposite to the direction of rotation of the rotor in such a manner that, whenever the free surface of the liquid rises to an extent that the diameter of the liquid surface in the auxiliary space is smaller than the outer diameter of the ring of blades, the additional heavy liquid component is forced inwardly into the passages between the blades and the supply of additional heavy liquid is stopped.

For further explanation, reference is had to the drawing, which illustrates, by way of example only, several centrifugal machines according to the invention. In this drawing:

Fig. 1 is a vertical sectional view of a centrifugal machine adapted for continuous operation and in which the supply of mixture to be separated is automatically controlled, and in which additional liquid is supplied at an automatically controlled rate, Fig. 2 is a vertical sectional view taken on the line 2—2 of Fig. 1, Fig. 3 is a horizontal sectional view on the line 3—3 of Fig. 1.

The centrifugal machines shown all comprise a rotor supported in bearings 1 and 2 and comprising a cylindrical central part 3 and 4, or any other number of conical parts 4 pointing with their apexes radially outwards, equally spaced around the periphery of said part, and each having an exhaust port 5 at its apex. A conical partition 6 separates an auxiliary rotor space from the main rotor space and coaxially therewith. Both spaces communicate with each other only at places remote from the axis of rotation. For the supply of the liquid mixture, there is provided in the centre of the rotor, a stationary, i. e. non-rotatable tube 7 with its opening a small distance above the bottom of the rotor. Mounted concentrically around tube 7 is a tube 8 for discharging the light liquid component of the mixture. Tube 8 opens into a chamber 9 provided on its periphery with two skimming pipes 10 (see Fig. 3). The discharge tube 8 and the chamber 9 with the skimming pipes 10 are stationary during rotation of the rotor. The chamber 9 and the skimming pipes 10 are accommodated within a compartment 11 separated, by a perforated wall 12, from the space wherein the separation proper of the liquid components takes place. The wall 12 is secured to the partition 6 and carries a number of other conical partitions 13 having openings 14 and serving to improve and accelerate the separation.

The present invention can suitably be used, inter alia, in the palm-oil industry for separating pure oil from the raw liquid squeezed from the pulp of the palm fruit, said liquid consisting of a mixture of fruit water and pure oil and containing dregs, i. e. sand or like impurities in addition to small fibres. The water and the dregs together form the heavy, and the oil forms the light component of the mixture.

If the raw liquid is fed into the centrifugal machine through the supply tube 7 and the rotor is rotated at the required speed, the separation of the oil from the heavy component will be accomplished and the boundary surface or region between the two components will establish itself for instance at 15. The position of the boundary region depends on the speed of the rotor, the cross sectional area of the exhaust ports 5 and the amount of heavy component supplied by the raw liquid per unit of time. Consequently, since under normal conditions the two first mentioned factors are constant, the boundary region 15 varies only dependent on the rate of supply of raw liquid. It is thus possible, by controlling said supply, to keep the boundary region, properly speaking, inside a narrow zone between a place at a predetermined distance from the axis, on the one hand, and, on the other hand, a place at a distance from the outer free edge of partition 6 where main space and auxiliary space communicate.

Since therefore in the machine of the invention, the boundary plane 15 is prevented from establishing itself near or beyond the outer edge of the partition 6, the separation is accomplished exclusively in the space vertically below partition 6 and only water, and sometimes dregs, can get access to the auxiliary space above said partition and to the neck 16 of the rotor. As, however, the dregs are relatively heavy, they will be discharged almost immediately through the ports 5. During operation, the water in the neck 16 has a free cylindrical hollow surface 17 whose radius or distance from the axis of rotation, is smaller than and varies in the same sense as the distance between the boundary surface 15 and said axis.

If the raw liquid contains a small amount of water and dregs, a large amount of said liquid would have to be supplied to the centrifugal machine per unit of time to prevent the boundary surface 15 from moving too far outwards, or oil from being discharged through the exhaust ports 5. Since a thorough separation requires a certain amount of time, the centrifugal machine would in such a case be overloaded and the separation could not be completed. In order to reduce the discharge, per unit of time, of water and dregs, the rotary speed of the centrifugal machine would have to be reduced, or the exhaust ports 5 would have to be throttled. This would, however, impair the thoroughness of the separation, or reduce the capacity of the machine.

It has now been found that a better separation and a more accurate control can be obtained by controlling instead of the supply of raw liquid, the amount of water in the centrifugal machine. To that end, the supply of raw liquid of predetermined composition is adjusted in such a manner that, at normal speed of the rotor, the amount of liquid discharged through the exhaust ports 5 exceeds that of the water and dregs supplied by the raw liquid.

It is clear that under these conditions, and without further provision, oil would also be discharged through said ports. In order to prevent this discharge of oil through ports 5, additional water is supplied in a quantity such that the boundary plane 15 establishes itself within the predetermined limits. Accordingly, it is the supply of additional water that should be controlled. The additional water is preferably supplied in such a manner, that it cannot mix with the raw liquid not yet subjected to the separation and thus need not be separated from oil. The centrifugal machine of the present invention has been designed for this purpose.

A stationary, annular chamber 31, whose outer wall is constituted as a rim of blades 32, is placed within the neck 16 of the rotor, said blades extending, from the inside to the outside, in a direction opposite the direction of rotation, as clearly shown in Fig. 5. A tangential inlet tube 33 supplies additional water to chamber 31. The ring of blades 32 is adapted to control automatically said supply. As long as the water surface 17 is spaced from the ring of blades, additional water will be supplied, through the passages between the blades into the neck 16. If, however, the water surface 17 engages the ring of blades and starts to enter the passages therebetween, the surface of the rotating water ring will be intercepted or cut by the blades directed against the current of the rotating water and will thus act as a skimming device urging water through the passages between the blades 32 inwards into chamber 31. As the ring of blades is stationary, when it engages the gyrating water or other liquid a skimming effect is produced, setting up a counter pressure within chamber 31. When this counter pressure equals the pressure of the additional liquid supply, this additional supply will be stopped. If the counter pressure exceeds the pressure of the additional liquid supply, the liquid will be discharged through the supply tube for the additional liquid. Consequently, during operation the water surface 17 will move within a narrow zone on both sides of the outer periphery of the ring of blades.

It is to be understood that, although the foregoing statements refer to the operation of the described centrifugal machines in the palm oil industry, the invention is not restricted thereto.

I claim:

Centrifugal machine for the continuous separation of two liquid components of a liquid mixture whether or not containing solids, comprising in combination a rotor, a space in said rotor in which the separation takes place, a stationary conduit for supplying liquid mixture to said rotor, exhaust ports disposed at the outer periphery of said rotor for discharging the relatively heavy component of said liquid mixture from said space, stationary skimming pipes, a second stationary conduit for discharging the relatively light liquid component of said liquid mixture, said conduit being connected to said skimming pipes, a second space in said rotor, said space being coaxially disposed with regard to said first mentioned space, a partition partially separating said two rotor spaces and radially extending such amount that said spaces communicate exclusively at points situated a greater distance from the axis of rotation than the boundary region between the two liquid components in the first space during normal operation, so that said second space is accessible to said heavy liquid component only, a third stationary conduit for additionally supplying said relatively heavy component of said liquid mixture, a stationary ring of blades being provided within said second rotor space, a chamber being surrounded by said ring of blades, said third conduit opening into said chamber, said blades extending outwardly in a direction opposite the direction of rotation of said rotor, whereby to urge said relatively heavy liquid component inwardly through the passages between said blades and to stop the supply of said additional heavy liquid component whenever the cylindric hollow surface of said liquid component in said second rotor space rises to a diameter smaller than the outer diameter of said ring of blades.

WILLEM van der WERFF.

REFERENCES CITED

The following references are of record in the file of this patent:

UNITED STATES PATENTS

| Number | Name | Date |
|---|---|---|
| 489,197 | Peck | Jan. 3, 1893 |
| 499,348 | Peck | June 13, 1893 |
| 1,469,230 | MacKaye | Oct. 2, 1923 |
| 1,749,291 | Lindgren | Mar. 4, 1930 |
| 1,887,476 | Lindgren | Nov. 8, 1932 |
| 2,144,229 | Ruda | June 17, 1939 |

FOREIGN PATENTS

| Number | Country | Date |
|---|---|---|
| 47,361 | Netherlands | Dec. 15, 1939 |
| 553,142 | Germany | June 22, 1932 |